UNITED STATES PATENT OFFICE.

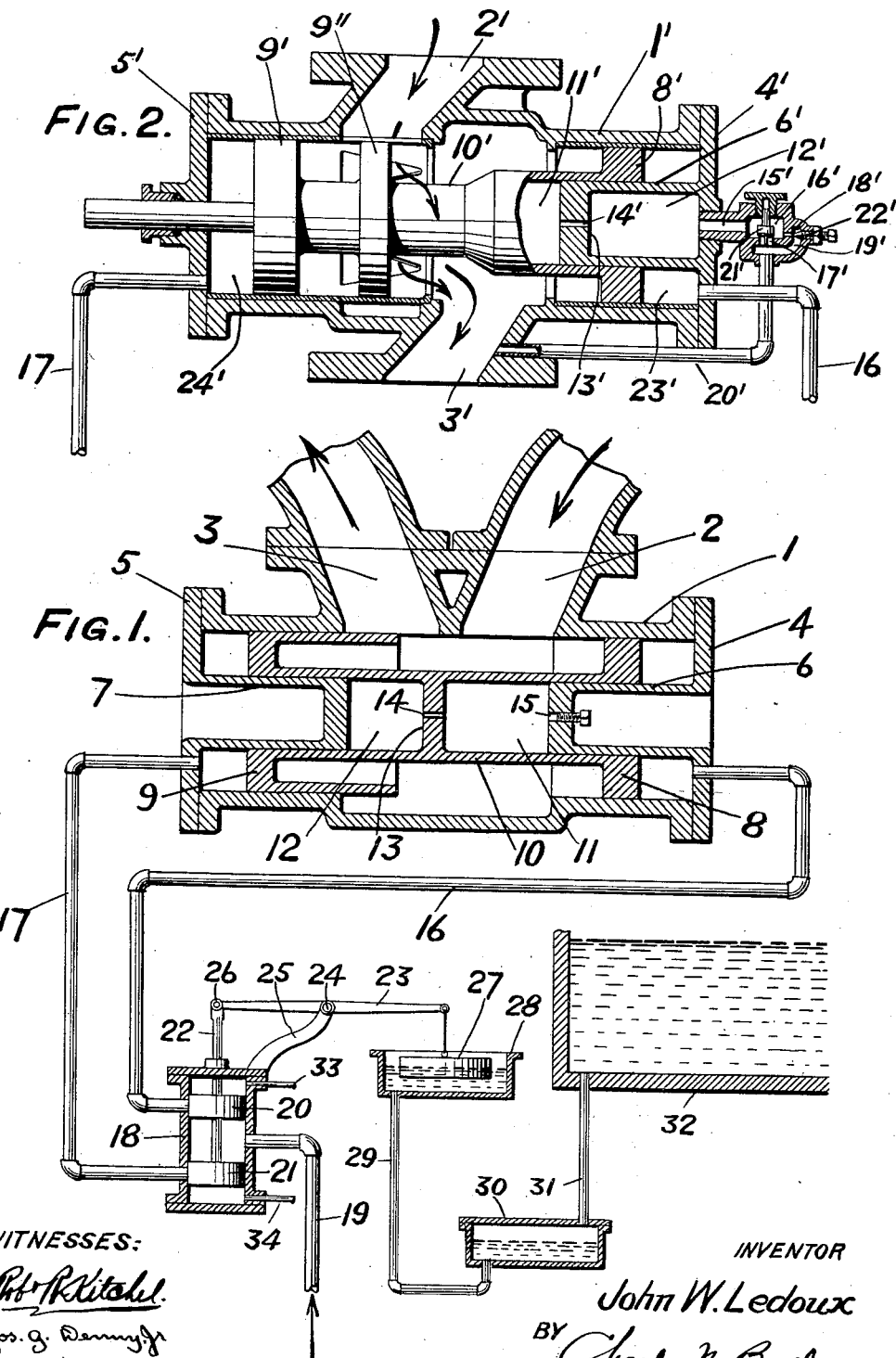

JOHN W. LEDOUX, OF SWARTHMORE, PENNSYLVANIA.

VALVE MECHANISM.

1,000,022.  Specification of Letters Patent.  Patented Aug. 8, 1911.

Application filed July 30, 1910. Serial No. 574,654.

*To all whom it may concern:*

Be it known that I, JOHN W. LEDOUX, a citizen of the United States, residing at Swarthmore, in the county of Delaware and State of Pennsylvania, have invented certain Improvements in Valve Mechanism, of which the following is a specification.

My invention is a valve mechanism, designed to operate automatically and gradually, for the purpose of regulating the flow of liquid without shock, and it is, in part, a division of my application filed Nov. 28, 1908, Serial Number 464,940.

In the accompanying drawings, Figure 1 is a sectional elevation of mechanism embodying the invention, and Fig. 2 is a sectional elevation of a second form of valve mechanism made in accordance with the invention.

The mechanism, as illustrated in Fig. 1, comprises a cylindrical casing 1 having an inlet port 2 and an outlet port 3 and the heads 4 and 5 provided with the inwardly projecting stationary pistons 6 and 7. Within the casing 1 is a movable piston valve comprising the heads 8 and 9 connected by the reduced body portion 10, the head 9 controlling the port 3. Cylindrical chambers 11 and 12 are formed within the movable piston valve for the reception of the respective stationary pistons 6 and 7, and between these chambers is a diaphragm 13 containing a small passage 14 by which a liquid, as oil, in these chambers may escape from one to the other, the oil being introduced suitably by way of a normally closed passage 15 in the head of the piston 6.

Pipes 16 and 17 connect the opposite ends of the casing 1 with the opposite ends of a cylindrical valve casing 18 with which is connected a pressure pipe 19. The casing 18 has therein a valve comprising the pistons 20 and 21 which are connected with the rod 22 extending through an end of the casing.

A lever 23 is fulcrumed by the pivotal bearing 24 on the bracket or strut 25 and is connected by the pivotal bearing 26 with the rod 22. A float 27 is connected with the lever 23, so as to balance the valve pistons 20 and 21, and depends into a vessel 28. The bottom of the latter vessel is connected by a pipe 29 with the bottom of a closed lower vessel 30 which in turn has its top connected by a pipe 31 with the bottom of the higher reservoir 32. Water contained in the reservoir 32 is sustained by a heavy liquid, such as mercury, contained in the parts 28, 29 and 30.

The head of the water in the reservoir 32 will determine the mercury level in the chamber 28, and this mercury level will, through the float and lever, determine the position of the pistons 20 and 21. As the head in the reservoir rises the pistons 20 and 21 fall, so as to establish communication between the pipes 17 and 19, and thereby pressure is communicated to the piston head 9. Acting under this pressure the valve is moved and its head 9 gradually closes the port 3, under the retarding influence of the liquid escaping from the chamber 11 into the chamber 12 through the contracted orifice 14.

To permit waste from the ends of the casing 18, to avoid the obstruction due to trapping water therein, the vents 33 and 34 are provided.

In the form of the invention illustrated in Fig. 2, the cylindrical casing 1' is provided with an inlet port 2' and an outlet port 3'. The casing, having the heads 4' and 5', contains the piston 6' projecting inwardly from the head 4', and a movable piston valve comprising the heads 8' and 9'—9'' formed on the reduced body 10'. A cylindrical chamber 11' extends through the head 8', into the body 10' of the reciprocating piston valve, for the reception of the stationary piston 6', which contains a chamber 12' communicating with the chamber 11' through the diaphragm 13' containing the small passage 14'. The chamber 12' communicates with a passage 15' connected with a valve chamber 16' which communicates by ports 17' and 18' with a passage 19' connected by the duct 20' with the port 3'. A puppet valve 21' controls the port 17' and an adjustable needle valve 22' controls the port 18'.

The pipes 16 and 17 are connected through the cylinder heads 4' and 5' with the cylinder chambers 23' and 24' in which the piston heads 8' and 9'—9'' act.

Similarly to the operation described in connection with Fig. 1, sufficient pressure communicated by the pipe 16 to the chamber 23' acts upon the head 8' and moves the piston valve back, whereby the part 9'', adapted for controlling communication between the ports 2' and 3', is moved back and communication between these ports is established. In this movement of the piston valve, water is drawn from the port 3' through the pipe 20', passage 19', port 17', chamber 16', passages 15', chamber 12', and passage 14', to the cylinder 11', and, because of the contracted character of the passage 14' and the restricted flow therethrough, the movement of the piston valve is retarded and the port 2' is opened gradually. When sufficient pressure is communicated through the pipe 17 to the chamber 24' the movement of the valve is reversed and the part 9'' gradually cuts off the communication between the ports 2' and 3'. This movement is gradual because of the time required for forcing the water from the chamber 11' and 12' through the contracted passages 14' and 18', the valve 21' being held down upon its seat and the valve 22', forming a by-pass being adjusted to regulate the time of action.

Having described my invention, I claim:

1. In a valve mechanism, a casing having an inlet and an outlet, a valve for controlling the communication between said inlet and outlet, a piston and cylinder connected with said valve to retard its action, and automatically operating mechanism, whereby fluid pressures are communicated alternately to opposite surfaces of said valve for the purpose of regulating its position.

2. In a valve mechanism, a chamber having a port, a piston adapted for reciprocating in said chamber to control said port, automatically operating means for communicating pressure to the opposite ends of said piston to effect its movement, in combination with a chamber and a piston acting therein to retard the action of said piston first named.

3. In a valve mechanism, a casing having a port, a reciprocating valve for controlling said port, a reciprocating piston chamber connected with said valve, a stationary chambered piston in said chamber, and a passage connecting the chamber of said last named piston with said reciprocating piston chamber.

4. In a valve mechanism, a reciprocating piston having a piston chamber therein, a stationary piston having a chamber therein communicating with said chamber first named, a fluid passage communicating with said second named chamber, a check valve for controlling said passage and a by-pass around said valve.

5. In a valve mechanism, a casing, a reciprocating valve therein, a piston chamber in said valve, a stationary piston in said chamber, a passage communicating with said chamber, a check valve opening to permit fluid to flow through said passage to said chamber, and an adjustable needle valve for regulating the flow from said chamber through said passage.

In witness whereof I have hereunto set my name in the presence of the subscribing witnesses, this 29 day of July 1910.

JOHN W. LEDOUX.

Witnesses:
 ROBERT JAMES EOSIN,
 JOS. G. DENNY, Jr.

---

Copies of this patent may be obtained for five cents each, by addressing the "Commissioner of Patents, Washington, D. C."